Aug. 12, 1930. S. H. HEINMILLER 1,772,996
QUACK GRASS DIGGER AND PLOW
Filed June 1, 1929 2 Sheets-Sheet 1
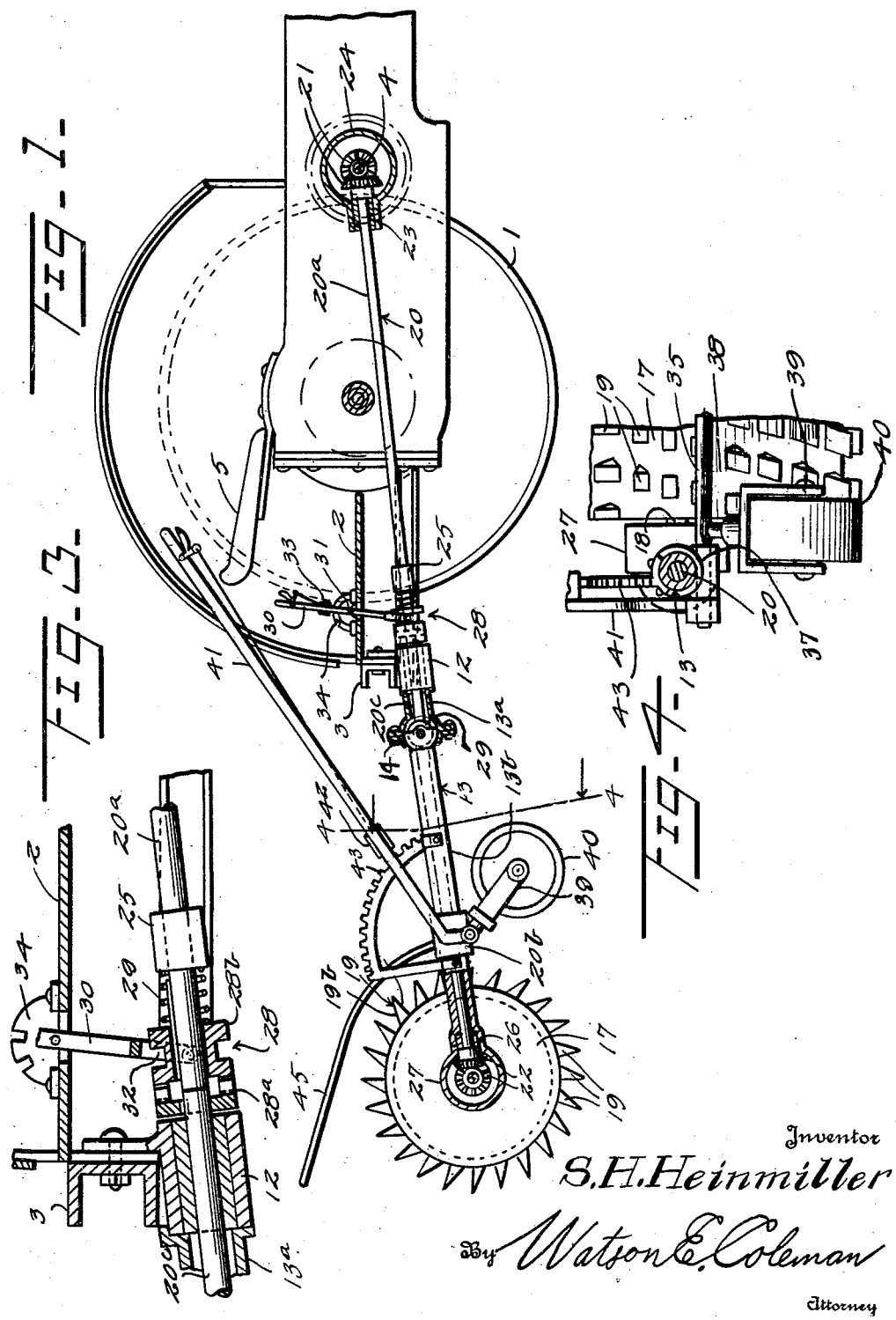
Inventor
S. H. Heinmiller
By Watson E. Coleman
Attorney

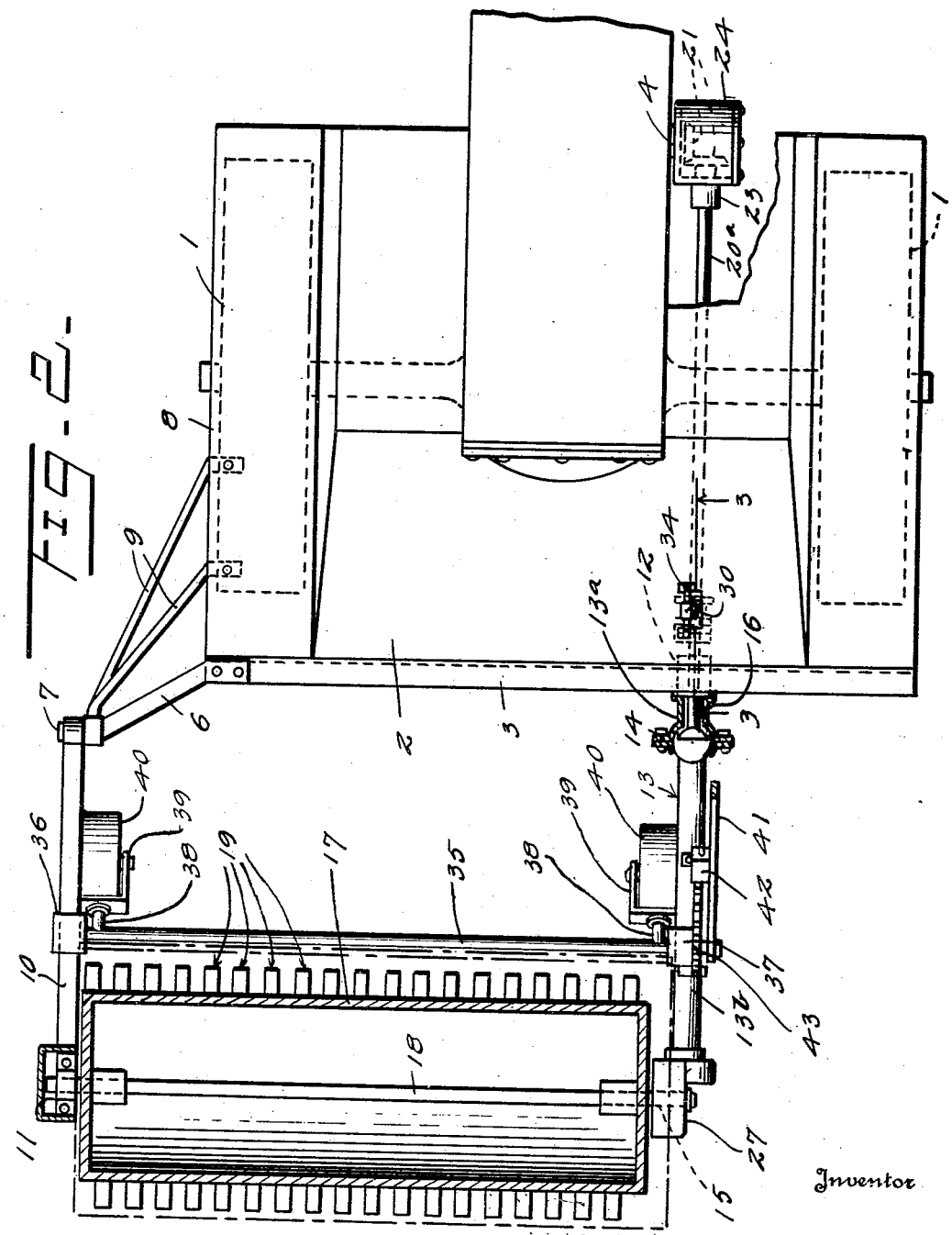

Patented Aug. 12, 1930

1,772,996

UNITED STATES PATENT OFFICE

SAMUEL H. HEINMILLER, OF NEW HAMPTON, IOWA

QUACK-GRASS DIGGER AND PLOW

Application filed June 1, 1929. Serial No. 367,720.

This invention relates to a quack grass digger and plow, and has for one of its objects to provide a novel, simple, durable and highly efficient device of this character which shall be adapted to be easily and quickly secured to a tractor of any make.

The invention has for a further object to provide a quack grass digger and plow which shall include a toothed drum, and means adapted to permit the drum to be rotated at high speed from the power takeoff shaft of the tractor, the teeth being of such formation and so relatively arranged on the drum as to effect the thorough loosening of the soil and the lifting and spreading of the grass roots over the loosened soil.

The invention has for a further object to provide a quack grass digger and plow wherein the means for connecting the drum to the tractor, and the means for driving the drum from the power takeoff shaft of the tractor, shall be of such construction as to permit the drum to be readily adjusted into inoperative or operative position, the means provided for adjusting the drum into either of its positions being adapted to support the drum in inoperative position so as to permit the machine to be moved from one field to another without danger of injury to the drum teeth.

The invention has for a further object to provide a quack grass digger and plow wherein the drum adjusting means shall embody a control lever arranged within convenient reach of the operator of the tractor.

With the foregoing and other objects in view, the nature of which will appear as the description proceeds, the invention consists in the construction, combination and arrangement of parts hereinafter fully described and claimed and illustrated in the accompanying drawings, wherein:—

Figure 1 is a view partly in side elevation and partly in vertical section of the quack grass digger and plow and the rear portion of a tractor;

Figure 2 is a view partly in top plan and partly in horizontal section of the quack grass digger and plow and the rear portion of the tractor;

Figure 3 is a sectional view on an enlarged scale taken on the vertical plane indicated by the line 3—3 of Figure 2; and Figure 4 is a sectional view taken on the planes indicated by the line 4—4 of Figure 1.

Referring in detail to the drawings, 1 designates the rear wheels, 2 the rear plate or platform, and 3 the rear frame bar of a tractor. 4 designates a power takeoff or pulley shaft, and 5 the seat of the tractor.

A bracket arm 6 extends laterally and rearwardly from the left hand end of the frame bar 3. It is provided at its outer end with a pivot lug 7, and its outer end is supported, from one of the wheel fenders 8 of the tractor, by braces 9. A bar 10 is pivotally connected at one end to the lug 7 and extends rearwardly therefrom and is provided at its rear end with a bearing 11. A boxing or bearing 12 is secured to the under side of the frame bar 3, said part being located between the longitudinal center and the right hand end of said bar and slightly beyond the outer end of the power takeoff shaft 4. A hollow bar or housing 13, which is of sectional formation and has the sections thereof connected together by a universal joint 14, is connected at its front end to the bearing 12 and is provided at its rear end with a bearing 15. The front or short section $13^a$ of the housing 13 is fixed, as at 16, to the bearing 12.

The bracket arm 6, braces 9, arm 10, bearing 12 and housing 13 constitute a frame for rotatably supporting a drum 17 and for connecting the drum to the tractor. The frame is pivotally connected to the tractor for rocking movement about the horizonal axis passing through the lug 7 and joint 14, so as to permit the drum 17 to be raised or lowered.

The drum 17 is fixed to a shaft 18 which is journaled in the bearings 11 and 15, and it is provided at its periphery with teeth 19. The teeth 19 have straight forward sides $19^a$ and inclined rear sides $19^b$. In other words, the teeth 19 are of substantially V-form in side elevation. The broad faces of the teeth 19 are secured to the drum 17 in any suitable manner.

The sharp outer ends of the teeth 19 are of considerable length and straight, and are arranged parallel to the periphery of the drum 17. The forward sides 19ª of the teeth 19 extend radially or substantially radially from the drum 17. The teeth 19 are arranged in rows extending longitudinally of the drum 17, and the teeth of the respective rows are arranged in staggered relation.

The formation of the teeth 19 and their relative arrangement and the arrangement of their front sides radially of the drum, enable them, when the drum is rotated at high speed, to thoroughly loosen or pulverize the soil and to lift the grass roots and deposit them upon the loosened soil, with the result that the soil will be in the best possible condition for planting.

The drum is rotated from the power takeoff shaft 4 through the medium of a shaft 20 which is connected to the power takeoff shaft by beveled gears 21 and to the drum shaft 18 by similar gears 22. The shaft 20 is of sectional formation, and the front end of the front section 20ª thereof is journaled in a bearing 23. The bearing 23 is carried by a housing 24 which surrounds the outer end of the power takeoff shaft 4, the gears 21, and the front end of the shaft section 20ª, said housing being adapted to contain lubricant for the gears and bearing. The rear end of the shaft section 20ª is journaled in a bearing 25 carried by the frame of the tractor. The rear section 20ᵇ of the shaft 20 is journaled in the longer section 13ᵇ of the housing 13. The rear end of the housing section 13ᵇ is provided with a bearing 26 for the rear end of the shaft section 20ᵇ. A housing 27 is fixed to the rear end of the housing section 13ᵇ, it carries the bearing 15, and it surrounds the gears 22 and is adapted to contain lubricant for them and the bearings 15 and 26.

The intermediate section 20ᶜ of the shaft 20 extends through the housing section 13ª and is journaled in bearing 12. The intermediate shaft section 20ᶜ is connected to the front shaft section 20ª by a clutch 28 and to the rear shaft section 20ᵇ by a universal joint 29.

The clutch member 28ª connected to the shaft section 20ᶜ, and the clutch member 28ᵇ slidably associated with the shaft section 20ª, are normally held in engagement by a spring 29 which is arranged on the shaft section 20ª between the bearing 25 and the clutch member 28ᵇ. A lever 30, arranged conveniently to the seat 5, provides means by which the clutch member 28ᵇ may be disengaged from the clutch member 28ª when it is desired to disconnect the drum 17 from the power takeoff shaft 4. The lever 30 is pivotally mounted as at 31 upon the platform 2, is connected as at 32 to the clutch member 28ᵇ, and is provided with a latch 33 for engagement with a notched sector 34 to hold it in adjusted position.

A shaft 35, arranged forwardly of and parallel to the drum 17, is journaled in bearings 36 and 37 carried by the bar 10 and housing 13, respectively. The shaft 35 is provided with downwardly extending spindles 38, and swivelly connected to the spindles are the frames 39 of rollers 40. A lever 41, fixed at one end to the shaft 35 and extending therefrom to a point convenient to the seat 5, provides means through the medium of which the operator may rock the shaft 35 to elevate or lower the rollers 40. When the rollers 40 are lowered, the drum 17 is raised into inoperative position, and when the rollers are raised, the drum moves into operative position.

The rollers 40 are held in the position to which they are moved by a latch 42 carried by the lever 40 and cooperating with a notched sector 43 secured to the housing 13, and the lever 44 functions with the shaft 18 to hold the drum in the position into which it is adjusted.

To prevent dirt from being thrown upon the tractor, a shield 45, which is secured to the bar 10 and housing 13, extends upwardly and rearwardly over the drum 17.

It should be understood from the foregoing description, taken in connection with the accompanying drawings, that the drum 17 is rotated at high speed in the direction indicated by the arrow in Figure 1, that the teeth 19 will thoroughly loosen the soil and spread the grass roots over the loosened soil, that the drum may be readily connected to and disconnected from the power takeoff shaft 4 of the tractor through the medium of the lever 30, and that the drum may be readily raised and lowered through the medium of the lever 41, both levers being within convenient reach of the operator of the tractor. The drum 17 is always under the instant control of the operator and may be raised to avoid stones and the like and to permit the tractor to be moved from field to field. When the drum 17 is raised, it is supported by the rollers 40 which as they are swivelly connected to the spindle 38 turn as the tractor turns.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A quack grass digger and plow, comprising a motor driven vehicle having a power takeoff shaft, a bar pivoted to the vehicle, a housing connected to the vehicle and embodying sections connected together by a universal joint, a shaft journaled on the bar and housing, a toothed drum fixed to the shaft, and a drive shaft geared to the power takeoff shaft and to the drum and passing through the housing.

2. A quack grass digger and plow, comprising a motor driven vehicle having a power takeoff shaft, a bar pivoted to the vehicle, a housing connected to the vehicle and embodying sections connected together by a universal joint, a shaft journaled on the bar and housing, a toothed drum fixed to the shaft, a drive shaft comprising a front section geared to the power takeoff shaft, a rear section geared to the drum shaft and extending through the housing and an intermediate section connected to the rear section by a universal joint, a clutch connecting the front and rear shaft sections, and a clutch operating lever.

In testimony whereof I hereunto affix my signature.

SAMUEL H. HEINMILLER.